April 3, 1951  E. L. MAYO ET AL  2,547,404
WINDSHIELD DEFROSTER FOR AUTOMOBILE HEATERS
Filed Sept. 20, 1946  2 Sheets-Sheet 1

Inventors:
Edward L. Mayo,
Arnstead G. Getz
By Brown, Jackson, Boettcher & Dienner
Attys.

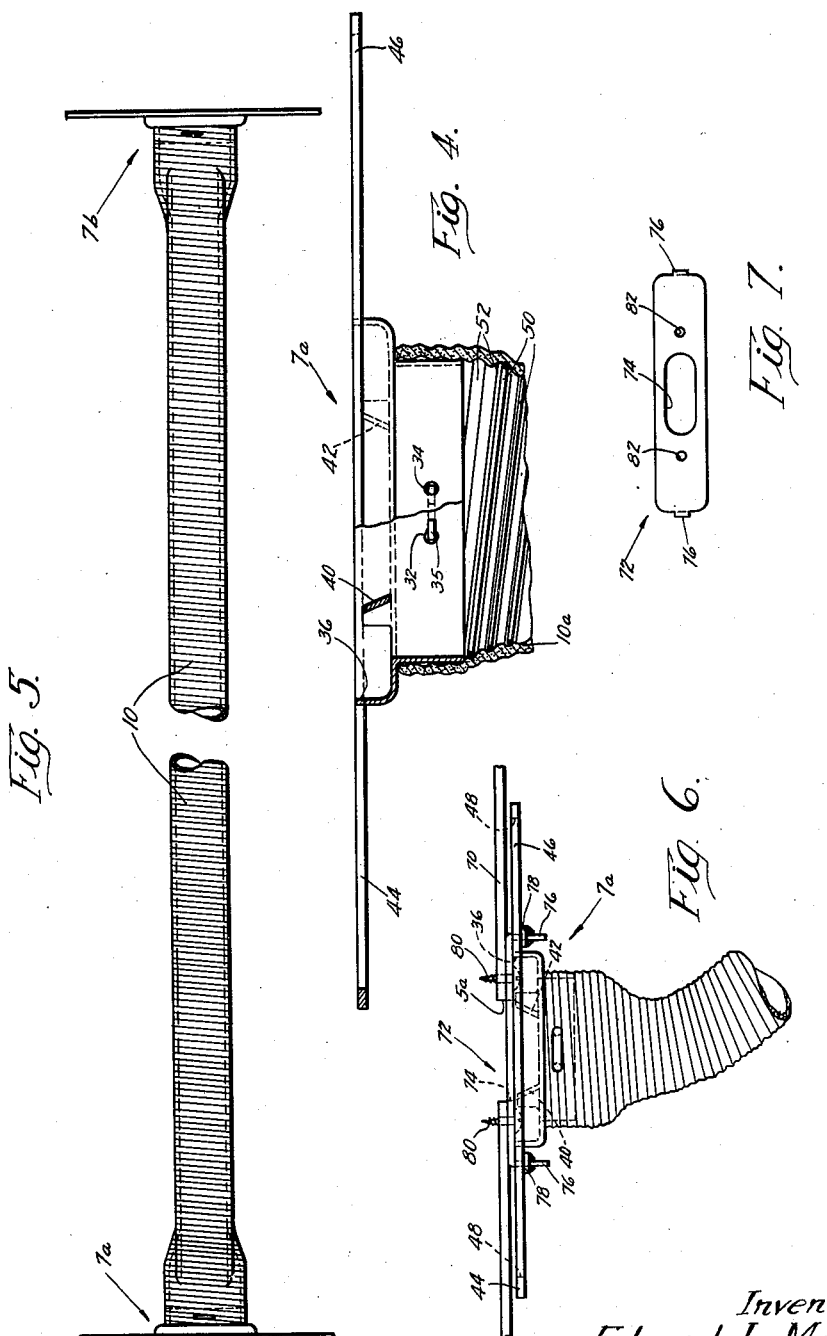

Patented Apr. 3, 1951

2,547,404

UNITED STATES PATENT OFFICE 2,547,404

WINDSHIELD DEFROSTER FOR AUTOMOBILE HEATERS

Edward L. Mayo, Cleveland, and Arnstead G. Getz, Lakewood, Ohio, assignors to The Bishop & Babcock Manufacturing Company, Cleveland, Ohio, a corporation of Ohio Application September 20, 1946, Serial No. 698,254

5 Claims. (Cl. 299—58)

Our invention relates to automobile windshield defroster equipment.

Automobile and truck manufacturers provide, and for some time past have provided, so-called "hot air slots" in the body, at the top of the dash-board, adjacent the bottom of the windshield, for the purpose of receiving hot air from a source thereof and delivering it upwardly against the inner surface of the windshield for defrosting purposes.

Many automobile heaters are provided with a hot air duct, or ducts (other than that or those for warming the passenger compartment) for the purpose of direct connection with such slots, and the purpose of the present invention is to provide equipment for such connection which shall, so far as possible, be universal in its application, i. e. be adaptable to the various makes of cars and trucks, the point being that the various makes of cars and trucks have their hot air slots of different lengths, and located at different distances apart, and have their heaters variously located.

To accomplish the said purpose, we provide, firstly, a length of flexible hose (of usual circular cross-section) formed to an elliptical shape at each end for the reception of a correspondingly shaped end of a nozzle member having an elongated discharge outlet and having an elongated slotted supporting flange at each end. The hose may be cut into appropriate lengths for connection to the appropriate duct or ducts of the heater, and the nozzle members may be applied to the hot air slots at the top of the dash-board, all as hereinafter described as an example, and, where necessary, an adapter may be employed between the nozzle members and the hot air slots.

The nozzle members are formed to require a minimum of space, and the length and width of their discharge outlets are such as to correspond to the longer and wider hot air slots likely to be encountered. The slotted flanges are of such length as to be adaptable to the reception of fastening means however located in various makes of cars and trucks. In exceptional cases, an adapter, which will be described, may be used to fit the nozzle members to the hot air slots.

Other features of our invention will become apparent from the following description, taken with the related drawings, in which:

Figure 4 is an elevational view of the nozzle member of Figure 3, part being broken away and shown in section; and the end of the attached hose being shown in section;

Figure 5 illustrates the hose and nozzle members as packaged and sold prior to installation;

Figure 6 is a view of the connection between a nozzle member and a hot air slot, with the employment of an adapter; and Figure 7 is a plan view of the adapter of Figure 6.

Like reference numerals have been employed in the several views to indicate the same elements.

Figure 1:
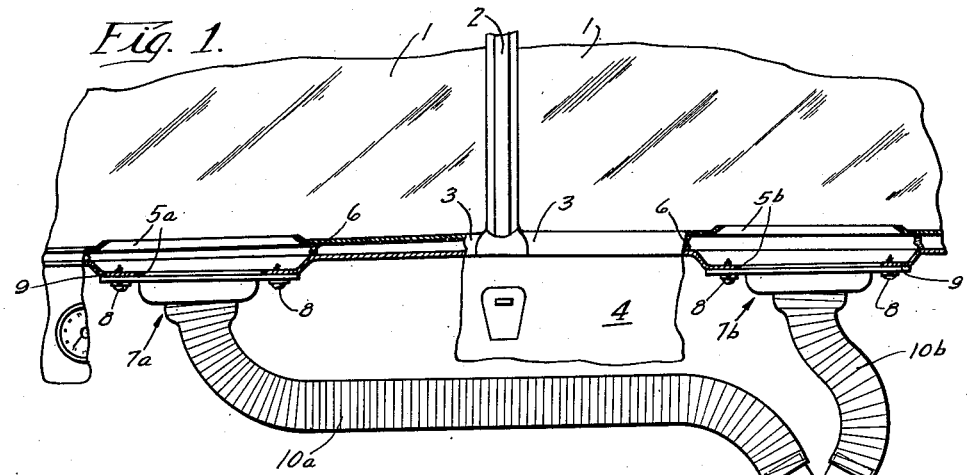
Figure 1 is a fragmentary view of the windshield of an automobile as though viewed from the front seat thereof, portions of the dashboard being broken away to reveal the hot air slots adjacent the windshield.

Referring now to Figures 1, 2, 3 and 4, an automobile windshield is indicated generally by the reference numeral 1, the windshield being formed of two portions divided by a frame member 2. The frame member 2 and frame members 3, which latter members go to form the upper portion of the dash-board 4, provide support for the windshield 1. Within the frame members 3 of the dash-board 4 are formed hot air outlets or slots 5a and 5b, respectively, each slot being located more or less centrally at the lower edge of the inner surface of the adjacent windshield portion 1. Gaskets, such as the gaskets 6, are usually employed in the frame members 3, about the slots 5a and 5b, so that all of the heated air will be conserved for direction to the windshield.

The nozzle members 7a and 7b, respectively, are connected to the lower openings of the slots 5a and 5b, by means of the screws 8, engaging in the downwardly struck portions 9 of the frame members 3. A section of hose 10a and another section of hose 10b serve to join a Siamese connection 11 of the heater 12 with the two nozzle members 7a and 7b.

Figure 2:
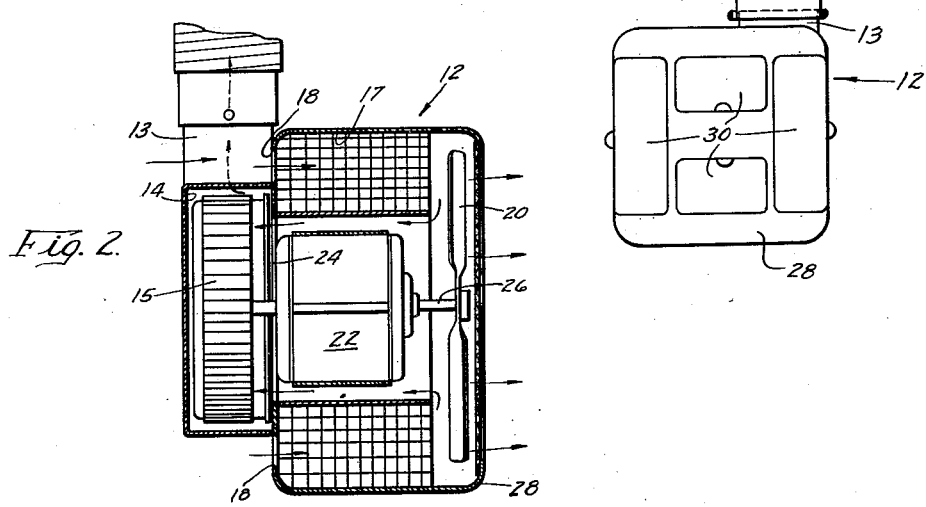
Figure 2 is a vertical sectional view of the heater of Figure 1 illustrating, more or less diagrammatically, the source and flow of heated air which is delivered to the hot air slots adjacent the windshield.

Referring now to Figure 2, which shows an adaptable heater, indicated generally by the reference numeral 12, it will be seen that there is an outlet duct 13 which joins the Siamese connection 11 with the housing 14 enclosing the blower 15. The casing of the heater contains a cellular radiator 17, in which hot water is circulated and through which air, entering by way of the opening 18, is drawn by the fan 20, driven by a motor 22, suitably supported on the back wall 24 of the casing and having shaft 26 carrying the fan 20 and also the blower 15. The front wall 28 of the casing has a plurality of adjustable doors 30 which may be opened to permit heated air to pass into the passenger compartment. A portion of the air drawn through the radiator 17 will be drawn inwardly and backwardly by the blower 15 and on to the outlet 13, for delivery through the flexible hose sections 10a and 10b to the respective hot air slots 5a and 5b.

Figure 3:
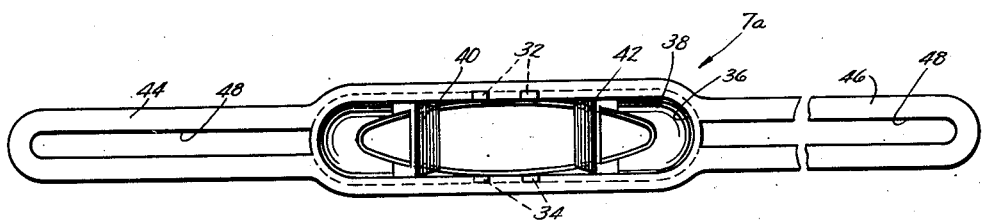
Figure 3 is an enlarged plan view of one of the nozzle members.

The nozzle members 7a and 7b are identical, and will now be described, referring particularly to Figures 3 and 4.

The nozzle member is substantially elliptical where it joins the flexible hose 10a, and has pairs of holes 32 and 34 on each of the sides, through which holes staples 35 may be passed to secure the hose and nozzle member together; where the hose 10a is connected to the nozzle member, it is flattened to an elliptical shape corresponding to that of the nozzle member end, and it fits it tightly. The discharge outlet is generally oblong in shape and the nozzle member flares to it (lengthwise) from the elliptical portion, as shown at 38. A pair of partition walls 40 and 42 extend across the narrow dimension of the portion 38, serving to strengthen the structure and also to direct the outward flow of hot air. As will be noted hereinafter, the distance between the upper edges of the walls 40 and 42, adjacent the discharge outlet 36, is substantially the same as the distance between the ends of the smaller hot air slots which are likely to be encountered.

From each end of the body of the nozzle member, flush with the top thereof, there extends an elongated flange, 44 and 46, having a slot 48 extending lengthwise thereof. Screws or bolts are adapted to pass through these slots 48, and by that means, the nozzle member may be secured to the body frame members, in juxtaposition to a hot air slot. In installations where the flanges are needlessly long (see Figure 1), they may be cut off to fit.

Figure 5 illustrates the hose and nozzle unit as sold to persons who desire to connect the heaters of their automobiles with defroster slots adjacent the windshield. It will be seen that there is a single long section of flexible hose 10, with a nozzle member, such as the nozzles 7a and 7b, secured at each end as has been described. In the preferred form, the hose is formed of a helical wire 50, fitted within a helically fluted covering 52. To give an idea of the dimensions of the various parts, it may be said that a hose having an inside diameter of approximately 1½ inches has been found satisfactory in actual use. The end of the hose abuts against the flaring portion of the nozzle member, aiding in forming a substantially air tight connection with the nozzle member. Sheet metal screws, screws with "speed nuts," or machine screws and nuts, are supplied with the hose and nozzle units, for use in securing the flanges on either side of the nozzle members to the dash-board in alignment with the hot air slots. As already pointed out, the hose is severed so that the proper connections can be made from the heater to the two nozzles.

The dimensions of the discharge outlets of the nozzles are such as to encompass the largest hot air slot likely to be encountered, and the nozzles are thus applicable to most cars and trucks. However, there are a few exceptions, and, to meet these cases, we provide an adapter for interposition between the discharge outlet of the nozzle member and the entrance to the hot air slot in the dash-board. As an example of such an adapter, reference is made to Figures 6 and 7.

The nozzle 7a is there shown connected to a frame member 70 having a small hot air slot 5a. An adapter plate, indicated generally by the reference numeral 72, is interposed between the frame member 70 and the nozzle member. The adapter plate 72 has a centrally-disposed short slot 74, substantially the size of the slot 5a, but smaller than the discharge outlet 36 of the nozzle 7a; the length of slot 74 is substantially equal to the distance between the upper edges of the walls 40 and 42 of the nozzle member. Downwardly projecting tabs 76, at the ends of the adapter plate 72, fit within the slots 48 of the flanges 44 and 46 of the nozzle member 7a, and the adapter plate and the nozzle member are secured together by clips 78 which are slipped over the ends of the tabs and into engagement with the flanges. Screws 80, passing through apertures 82 in the adapter plate 72, secure the adapter plate to the frame member. In making the connection illustrated in Figure 6, the adapter plate is first secured to the member 70, about the hot air slot 5a, by the screws 80, the nozzle member is then fitted over the tabs 76 of the adapter plate, and the clips 78 are slipped over the tabs to fasten the nozzle to the plate.

We claim:

1. In defroster equipment, in combination, a nozzle adapted to be used in conjunction with hot air slots which are located adjacent automobile windshields and which may be of varying sizes and locations, said nozzle comprising a tubular portion generally elliptical in cross section, adapted to receive a flattened end of a hose of circular cross section, said tubular portion flaring longitudinally to an enlarged portion having an elongated discharge opening corresponding in length to the longest hot air slot to be encountered, and slotted flanges connected with the nozzle and extending in opposite directions from said nozzle; and an adapter member having external dimensions as great as the discharge opening and having an aperture of dimensions corresponding to a hot air slot of smaller dimensions, said adapter member being aligned with the discharge opening of the nozzle by tongues which extend through the slotted flanges.

2. The combination of claim 1 together with a pair of transverse walls in the enlarged flared portion extending across its narrower dimension, the ends of said transverse walls adjacent the discharge opening being spaced apart a distance corresponding to the length of the aperture in said adapter member.

3. In defroster equipment, a nozzle adapted to be used in conjunction with hot air slots which are located adjacent automobile windshields and may be of varying sizes and locations, said nozzle comprising a tubular portion generally elliptical in cross section adapted to receive a flattened end of a hose of circular cross section, said tubular portion flaring longitudinally to an enlarged portion having an elongated discharge opening, an exterior shoulder formed on the tubular portion where it flares longitudinally outwardly from the elliptical cross section, said shoulder being adapted to have the end of the hose abut against it to form a substantially air-tight connection with the nozzle, and flanges connected with the nozzle and extending in opposite directions from said nozzle.

4. In defroster equipment, a nozzle adapted to be used in conjunction with hot air slots which are located adjacent automobile windshields and may be of varying sizes and locations, said nozzle comprising a tubular portion generally elliptical in cross section adapted to receive a flattened end of a hose of circular cross section, said tubular portion flaring longitudinally to an enlarged portion having an elongated discharge opening, a pair of outwardly flared transverse walls in the enlarged flared portion extending across its narrower dimension, said transverse walls serving to deflect a portion of the air flow through the nozzle, and slotted flanges formed integrally with the end walls of the nozzle adjacent its discharge opening, said flanges and discharge opening being disposed in the same plane and being adapted to seat flush against a wall, with the discharge opening aligned with a hot air slot in said wall.

5. An article of manufacture for use in automotive vehicles having hot air slots in a wall, or walls, adjacent the windshield and a source of hot air, comprising a pair of nozzles, each nozzle having a tubular portion generally elliptical in cross section, adapted to receive a flattened end of a hose of circular cross section, said tubular portion flaring longitudinally to an enlarged portion having an elongated discharge opening, a pair of outwardly flared transverse walls in the enlarged flared portion extending across its narrower dimension, said transverse walls serving to deflect a portion of the air flow through the nozzle, slotted flanges formed integrally with the end walls of the nozzle adjacent its discharge opening, said flanges and discharge opening being disposed in the same plane and being adapted to seat flush against a wall with the discharge opening aligned with a hot air slot in said wall, and a length of flexible hose having each of its flattened ends connected to the elliptical tubular portion of a nozzle, the length of said hose being such that it is at least equal to the combined distances from the source of hot air to the two hot air slots so that it will, when appropriately severed, interconnect the source of hot air and the pair of hot air slots regardless of the relative positions of said source and said pair of slots.

EDWARD L. MAYO.
ARNSTEAD G. GETZ.

REFERENCES CITED

The following references are of record in the file of this patent:

UNITED STATES PATENTS

| Number | Name | Date |
| --- | --- | --- |
| 1,209,386 | Brickey | Dec. 19, 1916 |
| 2,142,659 | Schumann | Jan. 3, 1939 |
| 2,152,338 | Will | Mar. 28, 1939 |
| 2,154,731 | Crowley | Apr. 18, 1939 |
| 2,277,869 | Meyerhoefer | Mar. 31, 1942 |
| 2,302,397 | Spackman et al. | Nov. 17, 1942 |